United States Patent
Bartsch

(10) Patent No.: US 8,904,087 B2
(45) Date of Patent: Dec. 2, 2014

(54) MEMORY MEDIUM HAVING DIFFERENT WAYS OF ACCESSING THE MEMORY MEDIUM

(75) Inventor: Armin Bartsch, Landsberg am Lech (DE)

(73) Assignee: Giesecke & Devrient GmbH, München (DE)

( * ) Notice: Subject to any disclaimer, the term of this patent is extended or adjusted under 35 U.S.C. 154(b) by 425 days.

(21) Appl. No.: 12/998,532

(22) PCT Filed: Oct. 27, 2009

(86) PCT No.: PCT/EP2009/064135
§ 371 (c)(1),
(2), (4) Date: Apr. 28, 2011

(87) PCT Pub. No.: WO2010/049413
PCT Pub. Date: May 6, 2010

(65) Prior Publication Data
US 2011/0219202 A1    Sep. 8, 2011

(51) Int. Cl.
*G06F 13/00* (2006.01)
*G06F 3/06* (2006.01)
*G06F 12/14* (2006.01)

(52) U.S. Cl.
CPC .......... *G06F 12/1441* (2013.01); *G06F 3/0622* (2013.01); *G06F 3/0679* (2013.01); *G06F 3/0659* (2013.01); *G06F 2212/2022* (2013.01)
USPC .................. 711/103; 711/154; 711/E12.082

(58) Field of Classification Search
CPC .. G06F 13/1694; G06F 3/0629; G06F 3/0635
See application file for complete search history.

(56) References Cited

U.S. PATENT DOCUMENTS

| | | | | |
|---|---|---|---|---|
| 5,956,285 A | * | 9/1999 | Watanabe et al. | 365/230.03 |
| 6,606,707 B1 | * | 8/2003 | Hirota et al. | 713/172 |
| 6,883,718 B1 | | 4/2005 | Le et al. | |
| 8,266,328 B2 | * | 9/2012 | Jang et al. | 710/2 |
| 8,375,222 B2 | * | 2/2013 | Kanai | 713/190 |
| 8,527,691 B2 | * | 9/2013 | Honda et al. | 711/103 |
| 8,667,242 B2 | * | 3/2014 | Lee | 711/163 |
| 8,751,764 B2 | * | 6/2014 | Okamura | 711/163 |
| 2007/0094470 A1 | | 4/2007 | Haustein et al. | |

(Continued)

FOREIGN PATENT DOCUMENTS

| | | |
|---|---|---|
| DE | 10 2007 050 463 | 5/2008 |
| EP | 1 577 780 | 9/2005 |
| WO | 2008/058705 | 5/2008 |
| WO | 2008/058741 | 5/2008 |

OTHER PUBLICATIONS

"SD Specifications, Part 1, Physical Layer Simplified Specification Version 2.00," SD Group (Panasonic, SanDisk, Toshiba) and SD Card Association, Sep. 25, 2006.

(Continued)

*Primary Examiner* — Sean D Rossiter
(74) *Attorney, Agent, or Firm* — Martine Penilla Group, LLP

(57) ABSTRACT

The invention provides a portable memory medium with a memory area and a memory management system for managing the memory area, wherein different options for access to the memory area are provided. The memory management system comprises a configuration command, the execution of which causes an activation of one of at least two different activatable memory configurations.

15 Claims, 2 Drawing Sheets

(56) References Cited

U.S. PATENT DOCUMENTS

| | | |
|---|---|---|
| 2007/0245063 A1* | 10/2007 | Fujimoto et al. .............. 711/100 |
| 2008/0229090 A1 | 9/2008 | Choi et al. |
| 2010/0049988 A1 | 2/2010 | Birman et al. |
| 2010/0057980 A1 | 3/2010 | Aschauer et al. |
| 2014/0201393 A1* | 7/2014 | Suzuki et al. ..................... 710/8 |

OTHER PUBLICATIONS

English translation of International Preliminary Report on Patentability (IPRP) issued in International Application No. PCT/EP2009/064135, May 12, 2011 (6 total pages).

* cited by examiner

MEMORY MEDIUM HAVING DIFFERENT WAYS OF ACCESSING THE MEMORY MEDIUM

FIELD OF THE INVENTION

The invention relates to a portable memory medium with a memory area and a memory management system for managing the memory area, wherein different options for access to the memory area are provided. Such a solution is known, for example, from WO 2008/058705.

BACKGROUND OF THE INVENTION

Memory media in the sense of the invention are used for holding ready various data, for example applications for various areas of use, or also media data such as photographs or films. The memory medium is designed to be portable and can have an exterior design as a flat card or alternatively as a token.

The memory medium has a memory area (mass memory) and a memory management system, e.g. a memory controller or a system of several coupled memory controllers through which the memory area is managed. The data are stored in the memory area. The memory area can be structured in partial memory areas. The memory management system provides a set of commands containing a plurality of pre-defined commands by means of which the tasks of the memory management can be carried out, such as, for example, reading (READ) or writing (WRITE) in the memory area, opening of parts of the memory (OPEN), or setting and canceling a write protection for the memory area. Some commands are kept free as reserved commands for possible tasks of the memory management that are to be configured later.

In principle, the memory area can be realized in any suitable—preferably electric—memory technology, in particular as a flash memory, but also as RAM, ROM or EEPROM.

Specific commands are specified, for example, in different interface standards that the memory medium meets. Examples for interface standards for memory media are SD (Secure Digital Memory Card), MMC (Multi Media Card), USB (Universal Serial Bus), SCSI (Small Computer System Interface). In the following, a memory medium is examined in part with reference to the example of the interface standard SD. The same applies analogously to memory media according to other interface standards.

Memory media according to the SD interface standard are described, for example, in "SD Specifications, Part 1, Physical Layer Specification" (http://www.sdcard.org) (hereinafter referred to as "SD-Spec"). The SD memory medium comprises a set of pre-defined commands. They permit the manufacturer, for example, to set write protection bits (commands CMD28, CMD29, CMD30) in order to protect data against being deleted. The SD memory card can be locked by a host by means of a "card lock" with the command CMD16. The lock can be disabled again with a password. A mechanical write protection tab offers another option for protecting data against deletion.

According to the SD-Spec, some commands, e.g. CMD60 et seqq., are reserved as so-called "manufacturer specific commands".

Frequently, commands are divided into a command type part, an argument part (sometimes also referred to as address part) and a data part. The data part contains a data body part (body) and optionally a routing information part (header) usually preceding the data body part.

In a conventional command such as, for example, write, the command type "write" is implemented in the command type part, the argument part (address part) specifies at which logical address in the memory area the write access is to be carried out, and the data part, more specifically the data body part, specifies what is to be written.

Optionally, the memory medium has a microprocessor, the task of the memory management optionally being carried out by the microprocessor. Examples of such portable memory media are smart cards equipped with a microprocessor and memory cards equipped with a memory controller. If the portable memory medium is used, for example, in the field of mobile radio, the portable memory medium can be designed, for example, as a smart card with a security module for using a terminal device (e.g. mobile phone) in a mobile radio network, or be integrated into such a smart card. The smart card is, for example, a SIM card for the GSM system or a USIM card for the UMTS system or a similar smart card. Optionally, the portable memory medium is designed as a pay-TV card for using pay TV, or is integrated into such a pay-TV card. Optionally, the portable memory medium is a secure flash card with an integrated smart card or a smart card integrated into a secure flash card, with the secure flash card comprising, as a memory management system, a flash controller superordinate to the smart card.

The portable memory medium can be read and written into by means of a terminal device. For example, a PC (personal computer), a mobile terminal device for a mobile radio network, e.g. a mobile telephone, PDA, smartphone etc., or a set-top box for pay TV is provided as a terminal device. In the case of a portable memory medium designed as a secure flash card or smart card integrated into a secure flash card, a mobile terminal device such as, for example, a mobile telephone, PDA or smartphone etc. can be provided as a terminal device. The terminal device has an operating system, for example a PC operating system or an operating system for mobile terminal devices, such as, for example Microsoft Windows, Microsoft Windows Mobile, Linux, Symbian or the like.

It can be desirable, especially for partial memory areas in the memory area in which applications are stored, that a user of the memory medium is unable to make any modifications so that applications are not inadvertently deleted, for example. However, it may be desired that other data are also protected against inadvertent or intentional deletion or modification.

Many PC operating systems make it possible to create different partitions in order to divide memory areas and to thus create, in the form of protected partitions, partial areas protected against the deletion of data. In many mobile terminal devices, the operating system does not offer the option of creating partitions on a memory medium used therein.

WO 2008/058741 describes a method for access to a memory medium with a memory area and a controller for managing the memory area in which data streams containing routing data are transmitted to an additional module, for example, a specially protected microprocessor or partial area of the controller.

Document WO 2008/058705, which is considered the closest state of the art, describes a memory medium with a memory area, and a memory management (controller) for managing the memory area, wherein different options for access to the memory area are provided. In the case of an access to the memory area via the memory management, specifying an address in the memory area, the memory management, in accordance with the address, forwards the access directly to the memory area, or to an additional module, which is a smart card microcontroller, for example. Different options for access are thus provided depending on the address specified during the access.

In the memory medium from WO 2008/058705, the corresponding addresses or address ranges compulsorily lead to an access being redirected to the additional module.

In some cases, a more flexible configuration of the memory management would be desirable, which would permit, for example, the creation of partitions on the memory medium irrespective of the operating system of a terminal device used for reading or writing on the memory medium, in order thus to protect data against deletion.

Conventionally, the memory area of a memory medium can be switched between two different memory configurations, i.e. "write access permitted" and "write access not permitted" when the write protection is set (enabled) and canceled (disabled) by means of a pre-defined command, e.g. in accordance with the SD Spec. In this case, the write protection comprises the entire memory area, or optionally partial areas, if the operating system of the terminal device in which the memory medium is operated supports a partitioning of the memory area.

SUMMARY OF THE INVENTION

The invention is based on the object of providing a memory medium with a memory area and a memory management for managing the memory area, in which memory medium different options for access to the memory area are provided in a flexible manner and irrespective of the terminal device used for operating the memory medium, in particular in order to protect data against deletion.

The object is achieved by a memory medium according to claim 1. Advantageous embodiments of the invention are specified in the dependent claims.

The memory medium according to the invention according to claim 1 comprises a memory area and a memory management system for managing the memory area. In the memory medium, different access options of access to the memory area are provided. The invention is characterized in that the memory management system comprises a configuration command, the execution of which causes an activation of one of at least two different activatable memory configurations. The different memory configurations differ in that at least one access command for accessing the memory area, depending on the activated memory configuration, is transmitted into a different partial memory area.

With the invention, the memory configuration of the memory medium can be adjusted or changed by being able to optionally activate one of several activatable memory configurations. Only a single memory configuration can respectively be activated at once. The other memory configurations (one or more) are inactive in this case. In order to cause an activation, the configuration command is called and executed, optionally together with one (or more) parameter(s) that specifies which of the memory configurations is to be activated. The configuration command is configured and optionally parameterized in such a way that the activatable memory configurations meet the wishes and requirements specified by, for example, the manufacturer or issuer of the memory medium, which offers a high degree of flexibility. For example, the configuration command can be configured in such a way that, in one of the activatable memory configurations, physical partial areas of the memory area are completely masked out, that is, cannot be addressed, or/and are masked out for write access and thus protected against deletion. Due to the fact that the configuration command is implemented in the memory medium itself, additionally, the different memory configurations are adjustable independent from a terminal device used for operating the memory medium.

In particular, different partitions can, for example, be realized in the memory area, with each partial memory area corresponding to a partition. Each activatable memory configuration then corresponds to a partial memory area or a partition.

Accordingly, a memory medium with a memory area and a memory management for managing the memory area is provided according to claim 1, in which memory medium different options for access to the memory area are provided in a flexible manner, irrespective of the terminal device used for operating the memory medium.

The access command is, for example, a read command for reading data from the memory area, or a write command for writing data into the memory area, or a delete command for deleting data in the memory area, or an open command.

Optionally, at least two different partial memory areas are disjoint. In that case, in particular the corresponding partitions are disjoint. Alternatively, different partial memory areas or partitions can overlap.

Optionally, an access command comprises an indication of a logical address, and transmission into a partial memory area comprises a translation of the logical address into a physical address of the memory area. Depending on the activated memory configuration, a translation of logical addresses into physical addresses of the memory area corresponding to the memory configuration is provided. For each of the activatable memory configurations, a translation of logical addresses into physical addresses of the memory area is provided which differs from the translations of the other memory configurations at least for one logical address. For memory configurations that provide disjoint partial memory area or partitions, a logical address range is translated, depending on the activated memory configuration, into a different physical memory area which does not overlap with the physical memory areas of the other memory configurations.

Optionally, at least one translation table, with which a translation of logical addresses into physical addresses can be carried out, is implemented in the memory medium. Optionally, one translation table is implemented in the memory medium for each activatable memory configuration.

Optionally, at least one of the different memory configurations comprises a write protection for at least one sub-area of the memory area. In this case, for example, at least one sub-area is masked out for at least one command, e.g. writing WRITE.

Optionally, the memory medium is configured for processing commands that comprise at least one command type part, wherein the configuration command is wholly or at least partially implemented in the command type part. A currently free manufacturer-specific command of a specification, for example, can be used for a configuration command implemented in the command type part. In that case, the configuration command can be configured in a similar way as a conventional command, for example for reading (READ) and writing (WRITE), with the type "Change Memory Configuration" being specified in the command type part instead of the type "READ", for example.

Accesses of a (local or remote) terminal device to the memory of the memory medium are possible using the access commands transmitted by the terminal device, that is, access commands received in the memory medium as external commands. Therefore, only the access commands are required for the accesses. In relation to the access commands, the configuration command is another external command that can be received in the memory medium by the terminal device. Thus, the configuration command could be considered a command that is superordinate to the access commands Optionally, the memory medium is configured for processing commands that comprise at least one argument part, wherein the configuration command is at least partially implemented in the argument part. Optionally, an address part is provided as an argument part. In this case, a logical address can be specified in the address part. The configuration command is optionally implemented in the argument part, at least in part, by the specification of a specific argument, e.g. a specific address, being interpreted as an instruction for activating a memory configuration. Optionally, a specific command part—e.g. a pre-defined command such as, for example, a read command or write command—is used in conjunction with a specific argument, e.g. a specific address, as a configuration command. Because of the specific argument, e.g. address, the pre-defined command, e.g. read or write, is in this case not interpreted anymore as a read or write command, but as the configuration command according to the invention for activating a memory configuration. A specific address is optionally processed as described in WO 2008/058705.

Optionally, the memory medium is configured for processing commands that comprise at least one data part, wherein the configuration command is at least partially implemented in the data part. The data part optionally has a routing information part (e.g. a header) and a data body part (body) which contains the actual data, with the configuration command optionally being implemented in the parts of the configuration command implemented in the data part, optionally in the routing information part (header) or/and in the data body part (body). For example, if a specific routing information part, e.g. a so-called "magic word", is recognized in a command in the routing information part (header) of the data part, the command is recognized and processed as a configuration command.

A configuration command implemented at least partially in the data part, particularly in the routing information (header), is optionally processed as in the processing of a routing information described in WO 2008/058741, in particular optionally with alternating receipt of command parts at the memory medium and transmission of responses from the memory medium.

Generally, a command comprising several parts, e.g. the command type part and/or argument part (address part) and/or data part is optionally processed in several steps, with alternating receipt of command parts at the memory medium and transmission of responses from the memory medium, in analogy to what is described in WO 2008/058741, for example.

Optionally, the memory medium comprises a specially secured additional module such as the one described in WO 2008/058741 or WO 2008/058705. The additional module optionally comprises a chip card (smart card) IC and/or specially secured partial areas of a memory controller. Optionally, the configuration command is at least partially implemented in the additional module.

In a configuration command implemented at least partially in the argument part by means of a specific address, the address is optionally evaluated and recognized as a specific address in a memory controller of the memory management system. Then, the configuration command is sent to the additional module for further processing. Functionalities of the configuration command that cause the activation of a memory configuration are implemented in the additional module.

Optionally, the additional module is specially secured and enables, for example, the setting of special security or access limitations.

BRIEF DESCRIPTION OF THE DRAWINGS

The invention will be explained in more detail below by means of exemplary embodiments and with reference to the drawing, in which.

DETAILED DESCRIPTION OF EMBODIMENTS OF THE INVENTION

Figure 1:
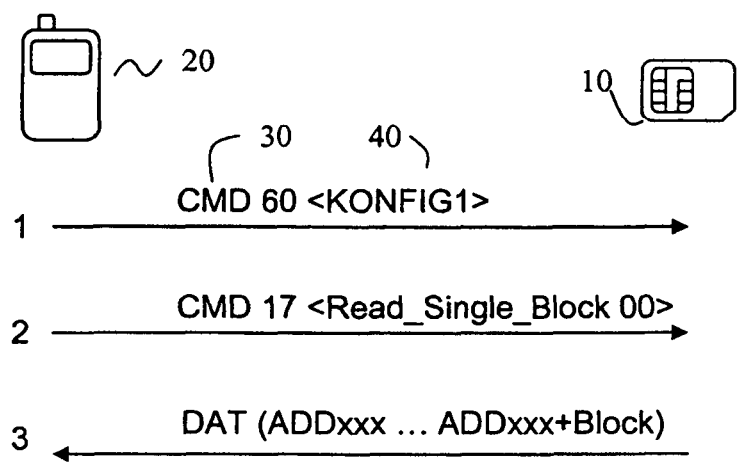
FIG. 1 schematically shows a memory medium according to the invention in communication with a terminal device, with activation of a first memory configuration with subsequent reading of a data block.

FIG. 1 shows a memory medium 10 according to an embodiment of the invention in communication with a terminal device 20 in which the memory medium 10 is operated. For the sake of clarity, the memory medium 10 is shown outside the terminal device 20. The memory medium 10 and the terminal device 20 communicated with each other through an interface. In a first step 1, a configuration command 30, for which a manufacturer-specific command CMD60 is used, is sent from the terminal device 20 to the memory medium 10. A specification as to which memory configuration is to be activated is sent as a parameter 40 together with the configuration command 30. In FIG. 1, a first memory configuration KONFIG1 is supposed to be activated. The first memory configuration KONFIG1 is activated in the memory configuration 10. In a second step 2, the terminal device 20 sends to the memory medium a read command CMD17<Read_Single_block> for reading a single memory block starting at the logical address "00". In a third step 3, the memory medium 10 translates, by means of a translation table implemented in the memory medium, the logical address 00 into a physical address ADD of the memory medium 10, in FIG. 1 the physical address "xxx", and sends the contents DAT of the physical memory addresses xxx to xxx+BLOCK, i.e. xxx+block size, to the terminal device 20.

Figure 2:
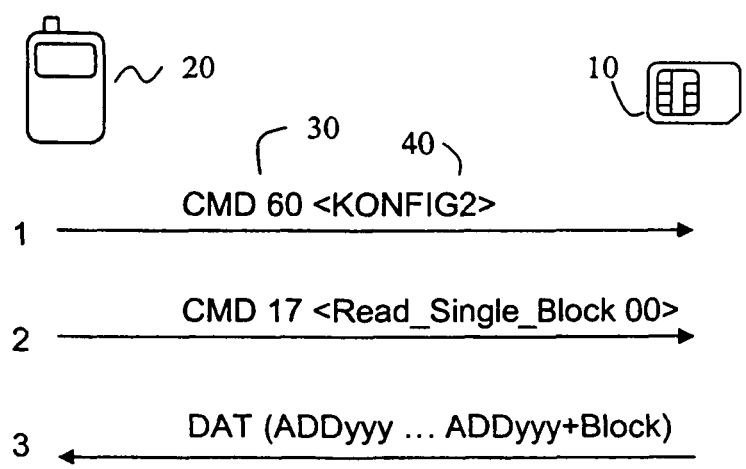
FIG. 2 shows the arrangement analogous to FIG. 1 for activating a second memory configuration.

FIG. 2 shows the arrangement analogous to FIG. 1 for activating a second memory configuration. In a first step 1, the configuration command 30 CMD60 is sent from the terminal device 20 to the memory medium 10, parameterized with the parameter 40, which specifies that the second memory configuration KONFIG2 is to be activated. The memory medium 10 thereupon activates the first memory configuration KONFIG2. In a second step 2, the terminal device 20, as in FIG. 1, sends to the memory medium a read command CMD17<Read_Single_block> for reading a single memory block starting at the logical address "00". In a third step 3, the memory medium 10 translates, by means of a translation table implemented in the memory medium, the logical address 00 into a physical address of the memory medium 10. In FIG. 2, the translated physical address ADD, corresponding to the second memory configuration KONFIG2, is equal to "yyy". This differs from the physical memory address ADD "xxx" of the first memory configuration KONFIG1. The memory medium 10 sends the contents DAT of the physical memory addresses xxx to xxx+BLOCK (xxx+block size) to the terminal device 20.

A translation table for a memory medium with three different memory configurations KONFIG1, KONFIG2, KONFIG3 can be configured, for example, as follows (schematic representation).

TABLE 1

| Logical address | Phys. address KONFIG1 | Phys. address KONFIG2 | Phys. address KONFIG3 |
|---|---|---|---|
| 00 | 0000 | 0100 | 1000 |
| 01 | 0001 | 0110 | 1001 |
| ... | ... | ... | ... |
| FF | 00FF | 01FF | 10FF |

In table 1, the physical addresses of the different memory configurations are offset relative to one another by a fixed offset.

In other exemplary embodiments, the assignment between the logical and the physical address is different (e.g. exchanged) only for individual memory cells, as is illustrated in the following table 2.

TABLE 2

| Logical address | Phys. address KONFIGA | Phys. address KONFIGB | Phys. address KONFIGC |
|---|---|---|---|
| 0000 | 0000 | 0000 | 0000 |
| 0001 | 0001 | 0100 | 0001 |
| 0010 | 0010 | 0010 | 0010 |
| 0011 | 0011 | 0011 | 0111 |
| 0100 | 0100 | 0001 | 0100 |
| 0101 | 0101 | 0101 | 0101 |
| 0110 | 0110 | 0110 | 0110 |
| 0111 | 0111 | 0111 | 0011 |
| ... | ... | ... | ... |

Figure 3:
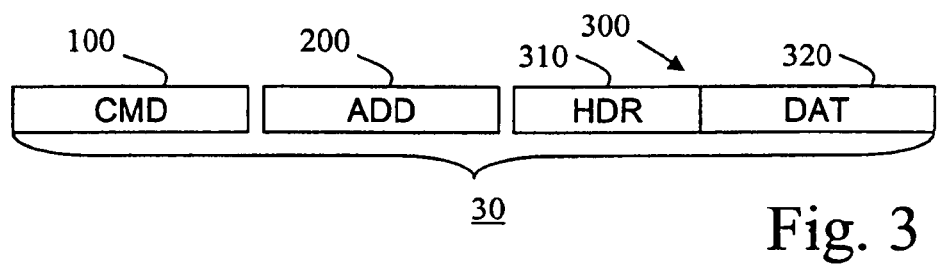
FIG. 3 schematically shows the structure of a command in which a configuration command according to the invention can be implemented.

FIG. 3 schematically shows the structure of a command in which a configuration command 30 according to the invention can be implemented. The command comprises a command type part CMD 100, an argument part ADD 200 and a data part 300. The data part 300 comprises a routing information part (header) HDR 310 and a data body part (body) DAT 320.

Figure 4:
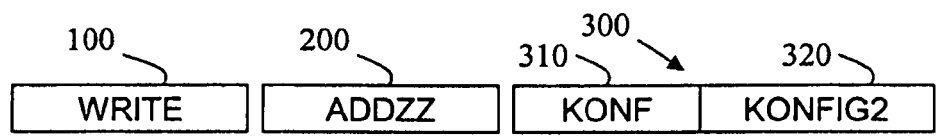
FIG. 4 shows a command according to FIG. 3, wherein a specific address is used for the implementation of a configuration command.

FIG. 4 shows a command according to FIG. 3, wherein a specific address ADDZZ in the argument part 200 is used for the implementation of a configuration command 30 according to the invention. More specifically, the configuration command 30 from FIG. 4 is formed from a standard command, in this case WRITE, in the data type part 100, a specific address ADDZZ in the argument part 200, a sub-command KONF in the routing information part (Header) 310 of the data part and a parameter KONFIG2 in the data body part (Body) 320 of the data part 300. The standard command WRITE in the command type part 100 is initially processed as usual. In response to the specific address ADDZZ in the address part 200, the configuration command 30 is sent to an additional module, a partial area of the memory management, for further processing. There, the sub-command KONF is implemented together with the parameter KONFIG2. The additional module processes the sub-command KONF from the header 310 together with the parameter KONFIG2 from the body 320 of the data part 300 and thus causes the activation of the memory configuration KONFIG2.

Figure 5:
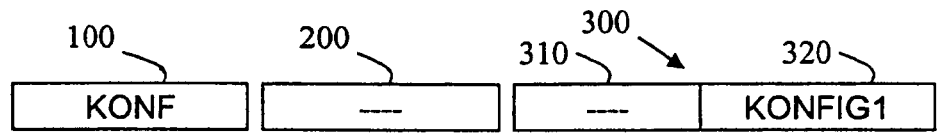
FIG. 5 shows a command according to FIG. 3, wherein a manufacturer-specific command is used for the implementation of a configuration command.

FIG. 5 shows a command according to FIG. 3, wherein a manufacturer-specific command KONF implemented in the data type part 100 is used for the implementation of a configuration command 30. The argument part 200 and the routing information part (header 310) of the data part 300 are dispensable in this type of implementation and can be omitted or remain empty. The parameter KONFIG1 that specifies the memory configuration to be activated is contained in the data body part (body) 320 of the data part 300.

Figure 6:
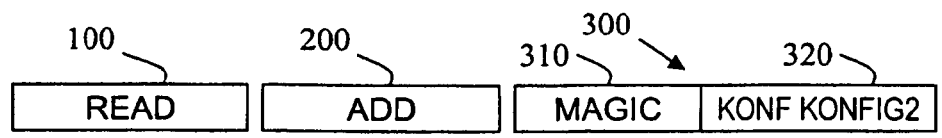
FIG. 6 shows a command according to FIG. 3, wherein a specific routing information or "magic word" is used for the implementation of a configuration command.

FIG. 6 shows a command according to FIG. 3, wherein a specific routing information or "magic word" MAGIC implemented in the routing information part (header) 310 of the data part 300 is used for the implementation of a configuration command 30. The command type part 100 contains a standard command, in this case the read command READ, the argument part 200 an arbitrary address ADD. The specific routing information MAGIC is contained in the routing information part (header) 310 of the data part 300. A sub-command KONF of the configuration command 30 and a parameter KONFIG2 are contained in the data body part 320 of the data part 300. The standard command READ in the command type part 100 is initially begun to be processed in a standard manner. In response to the specific routing information MAGIC in the routing information part (header) 320, the further processing of the command is transmitted to an additional module in which the sub-command KONF is implemented together with the parameter KONFIG2. By processing the data body part 320, the sub-command KONF is executed in the additional module together with the parameter KONFIG2, and the memory configuration CONFIG2 is thereby activated.

In the embodiments of FIGS. 4 and 6, in response to the specific address ADDZZ or the specific routing information MAGIC, the further processing of the configuration command 30 is transmitted to an additional module that can be specially secured. This is advantageous in that special security or access limitations, for example authentication requirements or the compulsory input of PINs, can be set for the configuration command 30, and thus, for the activation of memory configurations. Alternatively, however, the transmission to an additional module can be omitted and the further command processing can be carried out in the general part of the memory management system.

The invention claimed is:

1. A portable memory medium comprising:
    a memory area, and
    a memory management system for managing the memory area,
    wherein the memory area comprises at least a first partial memory area and a second partial memory area,
    wherein the portable memory medium has at least a first memory configuration and a second memory configuration that are adapted to be selectively activated, wherein the portable memory medium is adapted to receive external commands from a terminal device that is external to the portable memory medium, the external commands including at least one access command for accessing the memory area and at least one configuration command for activating one of the first memory configuration or the second memory configuration, wherein the portable memory medium is adapted to direct the at least one access command (i) to the first partial memory area if the first memory configuration is activated, and (ii) to the second partial memory area if the second memory configuration is activated, wherein the at least one configuration command received by the portable memory medium comprises a command type part, an argument part, and a data part, and wherein the portable memory medium is configured for processing the at least one configuration command by operations including a determination whether to activate the first memory configuration or the second memory configuration, the determination depending at least partially on information contained in the data part of the at least one configuration command.

2. The portable memory medium according to claim 1, wherein the first and the second partial memory areas are disjoint.

3. The portable memory medium according to claim 1, wherein the at least one access command comprises a specification of a logical address, and the operation of directing the at least one access command to one of the first and the second partial memory areas comprises a translation of the logical address into a physical address of the respective memory area, wherein, depending on the activated memory configuration, a translation of the logical address into the physical address is carried out that, at least for one logical address, is different for each memory configuration.

4. The portable memory medium according to claim 3, comprising at least one translation table for the translation of logical addresses into physical addresses according to the activated first or second memory configurations.

5. The portable memory medium according to claim 1, wherein at least one of the first and second memory configurations comprises a write protection for at least one sub-area of the memory area.

6. The portable memory medium according to claim 1, wherein the at least one configuration command is, in addition to being partially implemented in the data part, further partially implemented in the command type part.

7. The portable memory medium according to claim 1, wherein the at least one configuration command is, in addition to being partially implemented in the data part, further partially implemented in the argument part.

8. The portable memory medium according to claim 1, wherein the memory management system comprises an additional module, with the at least one configuration command being implemented at least partially in the additional module.

9. The portable memory medium according to claim 1, wherein the external commands received by the portable memory medium are commands according to the SD specifications.

10. The portable memory medium according to claim 9, wherein the command type part of the at least one configuration command received by the portable memory medium comprises a command type that is different from the command type of any configuration command defined by the SD specifications.

11. The portable memory medium according to claim 1, wherein the command type part of the at least one configuration command received by the portable memory medium comprises a command type that, according to a standard that determines the formatting of the external commands received by the portable memory medium, is different from the command type of any configuration command defined by the standard.

12. The portable memory medium according to claim 1, wherein the command type part of the at least one configuration command received by the portable memory medium comprises a command type that, according to a standard that determines the formatting of the external commands received by the portable memory medium, is an access command type.

13. The portable memory medium according to claim 1, wherein the command type part of the at least one configuration command received by the portable memory medium comprises a command type that designates a WRITE operation.

14. The portable memory medium according to claim 13, wherein the data part of the at least one configuration command received by the portable memory medium corresponds to a portion of the at least one configuration command, wherein said portion, if the command were interpreted as a WRITE command according to the command type contained in the command type part, would comprise data to be written into the memory area of the portable memory medium.

15. The portable memory medium according to claim 1, wherein the command type part of the at least one configuration command received by the portable memory medium comprises a command type that designates a READ operation.

* * * * *